United States Patent

[11] 3,613,518

| [72] | Inventor | David G. Prosser<br>Milwaukee, Wis. |
|---|---|---|
| [21] | Appl. No. | 889,670 |
| [22] | Filed | Dec. 31, 1969 |
| [45] | Patented | Oct. 19, 1971 |
| [73] | Assignee | Autorol Corporation<br>Milwaukee, Wis.<br>Continuation-in-part of application Ser. No. 800,481, Feb. 19, 1969, now abandoned. |

[54] DIAPHRAGM ACTUATOR
3 Claims, 8 Drawing Figs.

[52] U.S. Cl................................................. 92/98 RD,
92/99, 74/18.1, 73/407
[51] Int. Cl................................................... F16j 3/00
[50] Field of Search.......................................... 92/97, 98,
99, 156, 98 RD, 103 SD, 103, 103 M, 41, 93, 96;
103/114 TE, 114 S; 73/407, 388 B, 388 N; 251/61,
298; 137/525, 525.3; 74/18.1, 18.2

[56] References Cited
UNITED STATES PATENTS

| 2,178,953 | 11/1939 | Chilton | 92/98 X |
|---|---|---|---|
| 3,070,029 | 12/1962 | Russell | 92/99 |
| 3,124,959 | 3/1964 | Pall et al. | 73/407 |
| 3,249,022 | 5/1966 | Bolger | 92/103 X |
| 3,372,841 | 3/1968 | Olson | 251/303 X |
| 3,397,621 | 8/1968 | Groves | 92/103 X |
| 3,424,011 | 1/1969 | Pontis | 74/18.1 |

*Primary Examiner*—Martin P. Schwadron
*Assistant Examiner*—R. H. Lazarus
*Attorneys*—Thomas O. Kloehn and Thomas W. Ehrmann

ABSTRACT: A diaphragm actuator includes a rigid lever that has an internal arm embedded in a soft resilient rubber membrane to reciprocate pivotally between two chambers in a housing and an external arm which projects out of the housing to reciprocate pivotally externally of the housing. Two hollow members clamped together against a seal formed about the periphery of the membrane make up the housing. The seal also serves as a fulcrum where the lever projects out of the housing. Either end of the lever may serve as a force end or a work end.

PATENTED OCT 19 1971　　3,613,518
Fig.1
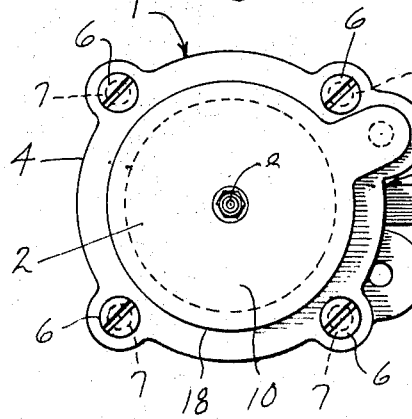
Fig.2
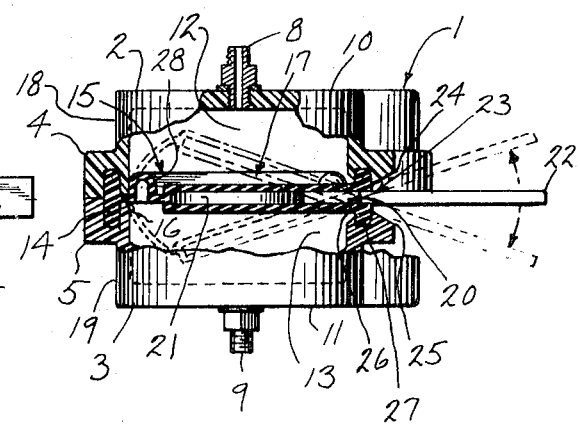
Fig.3
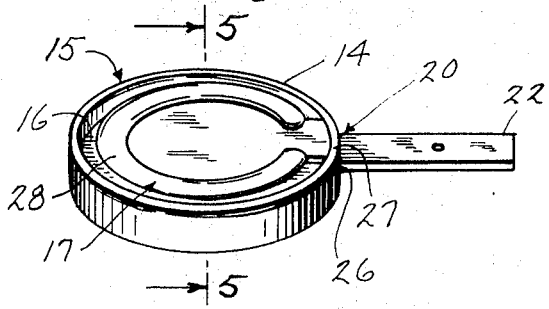
Fig.4
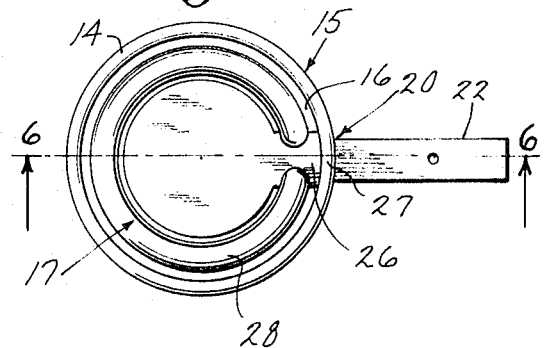
Fig.5
Fig.6
Fig.7
Fig.8
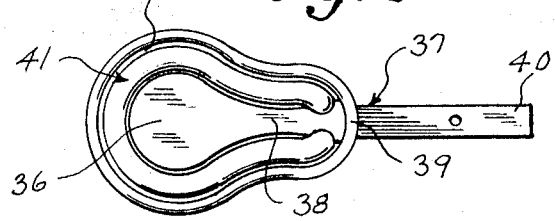
INVENTOR
DAVID G. PROSSER
BY Thomas O. Kloehn
ATTORNEY

3,613,518

DIAPHRAGM ACTUATOR

RELATED APPLICATIONS

This application is a continuation-in-part of the copending application of the same inventor entitled, "Pressure Differential Diaphragm Actuator", Ser. No. 800,481, filed on Feb. 19, 1969, now abandoned.

BACKGROUND OF THE INVENTION

The present invention is of that class of devices that employ a flexible, impervious diaphragm separating two chambers so that the diaphragm may be displaced into one or the other of the chambers either responsive to a pressure differential between the chambers, or to generate a pressure condition in one or both chambers responsive to an external force. Hence such a device provides transducer means for translating the motion of the diaphragm outside of the device to perform a desired function, or to translate external motion or forces to the interior of the device. In some instances, the pressure differential is employed to perform work, as in a vacuum-operated automobile windshield wiper such as is shown in U.S. Pat. No. 1,684,850. In other instances, pressure differential diaphragm actuators are used to sense a pressure difference and actuate an instrument as in U.S. Pat. No. 1,371,242. Still further uses of similar devices can be seen in U.S. Pat. Nos. 2,495,369; 3,198,089 and 3,358,566, Where the work end of the actuator is inside the sealed system and the force end is outside, the actuator may perform a variety of tasks, such as those of a pump, a shock absorber, a spring, or the like.

The present invention grew out of a need for controls for automatic water-softener mechanisms which automatically initiate regeneration of resins when the hardness of the water flowing out of the water softener reaches a predetermined level. An actuator was needed to detect and signal a change in volume of a sensing resin that is washed by a sample of water leaving the softener indicating that the softener resin had become exhausted. An actuator for that use must be easily and durably sealed against leakage. Since one large market for water softeners is direct consumer use in homes, such an actuator must be stable, durable and reliable so that it can function for extensive periods without maintenance of any sort. Also, an actuator is such an installation must be sensitive to relatively small pressure differentials, but the output of the actuator must have sufficient power without additional amplification to actuate mechanical devices. Finally, the actuator must be structurally simple and inexpensive to manufacture so that its cost is sufficiently low to make it available to individual consumers on commercial, residential water softening devices. However, an actuator satisfying such specifications has utility in numerous other applications.

SUMMARY OF THE INVENTION

The present invention relates to a diaphragm actuator whereby forces may be translated either into or out of a system, and more specifically the invention resides in a rigid lever, which has an internal arm fastened to a membrane peripherally mounted in a system, which has a fulcrum portion mounted for pivotal movement through a flexible fulcrum seal, and which has an external arm projecting beyond the fulcrum seal externally of the system.

A diaphragm actuator embodying the invention of the foregoing combination will be extremely versatile in that by adopting the correct configurations and dimensions for the diaphragm and the lever, which dimensions are calculable, it can be made to meet the needs of vast variety of installations or desired uses. By changing the area of the diaphragm, the total force available can be increased or reduced, and by varying the moment arms of the force end to the fulcrum and of the work end to the fulcrum the desired output force and speed is readily achieved. Such a diaphragm actuator can be made to respond accurately to minute pressure differentials, both because of the foregoing properties and because there are no moving parts in frictional engagement. The lever is mounted in a soft, resiliently flexible sealing member which allows the lever to be pivoted with a very minute force and returns it to its equilibrium position when the force is removed. Hence, by selection of the material, structure and mounting of the sealing member about the fulcrum as well as its structure and mounting, the sensitivity of the diaphragm actuator is readily and precisely controlled. The same properties make the diaphragm actuator a highly efficient, versatile and durable pump, shock absorber or the like. Because of the lack of moving parts, a diaphragm actuator according to the present invention is readily manufactured and assembled at a minimum cost and can operate without servicing or repair until the materials wear out. When repair or servicing is necessary, it can be quickly and inexpensively accomplished. Such a diaphragm actuator can provide a very effective and durable seal between portions of a system and between the system and its outside environment.

BRIEF DESCRIPTION OF THE DRAWINGS

In the drawings,

FIG. 1 is a plan view of a diaphragm actuator embodying the present invention, mounted in a housing to separate the two chambers of the housing, FIG. 2 is a side elevation of the diaphragm actuator in the housing shown in FIG. 1 with portions broken away to reveal interior structure, FIG. 3 is a perspective view of the diaphragm actuator shown in FIG. 1 and 2, FIG. 4 is a plan view of the diaphragm actuator shown in FIG. 3, FIG. 5 is a view in section of the diaphragm actuator taken along line 5—5 in FIG. 3, FIG. 6 is a view in section of the diaphragm actuator taken along the line 6—6 in FIG. 4, FIG. 7 is a plan view of a diaphragm actuator of a second embodiment of the invention, and FIG. 8 is a plan view of a diaphragm actuator of a third embodiment of the invention.

DESCRIPTION OF THE PREFERRED EMBODIMENT

The first embodiment is mounted in a housing 1 that is circular in plan view as can be seen in FIG. 1, and the housing 1 is made up of two cup-shaped housing members 2 and 3 each of which has a radially extending annular flange 4 and 5, respectively, for assembling the two housing members 2 and 3 together. The flanges 4 and 5 have assembly bolt holes 6 through which assembly bolts 7 are secured to hold the housing members 2 and 3 together. The cup-shaped housing members 2 and 3 are made of a rigid plastic material such as Nylon or Teflon, and each has a brass fitting 8 and 9, respectively, screw mounted through openings at its end wall 10 and 11, respectively, to provide ports 8 and 9 to respective chambers 12 and 13, respectively.

The housing members 2 and 3 are sealed together by a sealing ring member 14 that is clamped in an annular seat formed by mating grooves in the flanges 4 and 5 of the housing members 2 and 3. The sealing ring 14 is also an integral part of a diaphragm 15 that separates the chambers 12 and 13 which isolates them from each other, and which, with the housing members 2 and 3 defines the chambers 12 and 13. Thus the sealing ring 14 serves as a means for anchoring a peripheral edge 16 of a membrane 17 of the diaphragm 15 to the interior of cylindrical sidewalls 18 and 19 of the housing members 2 and 3, for sealing the housing members 2 and 3 together, and for sealing each of the chambers 12 and 13 individually.

In addition to the membrane 17, this embodiment of a diaphragm actuator according to the present invention includes a rigid, stainless steel lever 20. The lever 20 has one arm 21 fastened to the membrane portion 17 inside of the housing 1 by embedding it centrally within the membrane 17, so this internal arm 21 and the membrane 17 combine to make up the diaphragm 15. In the first embodiment, the end of the internal arm 21 of a lever 20 is circular. A contiguous rectangular extension of the internal arm 21 of the lever 20 forms another arm 22 of the lever 20 which projects out of the housing 1. This external arm 22 of the lever 20 projects out of the housing 1 through an opening 23 in the housing created by mating notches 24 and 25 in sidewalls 18 and 19, respectively, of the housing members 2 and 3. The lever 20 has a fulcrum 26 portion at the opening 23 where the sealing ring 14 forms a seal closing the opening 23 tightly around the fulcrum portion 26 so as to preserve the tight seal enclosing the chambers 12 and 13, and a portion 27 of the sealing ring 14 that seals the opening 23 around the fulcrum portion 26 of the actuator lever 20 also provides a fulcrum for the lever 20. Hence, the portion 27 of the sealing ring 14 at the opening 23 can be referred to as the fulcrum-seal 27. Between the periphery 16 of the membrane 17 and the circular end of the internal arm 21 of the lever 20, the membrane 17 has an annular pleat 28 that can be deformed and extended to facilitate movement of the lever 20.

The membrane 17 can be made of a soft, flexible, resilient Buna-N rubber, so that it will be easily stretched by a light stress and will accurately return to its normal shape as soon as the stressing force is removed. This same soft material would also form the sealing ring 14 including the fulcrum seal 27. Thus the lever actuator 20 can pivot frictionless and easily about its support in the fulcrum seal portion 27 of the soft sealing ring 14 by deforming and stretching the fulcrum seal portion 27. This type of pivotal support, by eliminating all friction surfaces and by allowing free movement, makes possible either a highly sensitive and accurate pressure differential operated diaphragm actuator, or a highly efficient transducer for translating rigid mechanical forcer or movements into a sealed system.

Either the movement and force transmitted by, or the sensitivity of the diaphragm actuator embodying the present invention can be magnified by changing its configuration so as to obtain a greater mechanical advantage, as is illustrated in the second and third embodiments of the invention. The second embodiment employs a lever 29 with an elongated rectangular internal arm 30 which is also embedded in a membrane 31 that has a sealing ring 32 for mounting the diaphragm between the housing members (not shown) and sealing the chambers (not shown) about the diaphragm. The membrane 31 has a pleated portion 32 surrounding the internal arm 30 of the lever 29 to minimize resistance to the movement of the lever 29. The lever 29 also has an external arm 34 which would project outside of the housing (not shown) in the same manner as the external arm 22 of the lever 20 in the first embodiment.

In the third embodiment, a pear-shaped membrane 35 has a circular end 36 on an elongated internal arm 38 of a lever 37, and the circular end 36 is embedded in its enlarged portion. A fulcrum portion 39 of the membrane 35 is formed at the small end of the pear-shaped member 35. An internal arm 40 projects out of the pear-shaped membrane 35 at its small end and would extend out of the housing (not shown) in much the same manner as the external arm 22 of the lever actuator 20 of the first embodiment. In the third embodiment, there is combined the advantage of leverage obtained through the elongated lever arm 38 and the increased total force obtainable at the internal end 36 as a result of the relatively large area of the circular end 36, which can receive or transmit and magnify forces.

The present invention is readily adapted to satisfy the needs of any situation wherein a pressure differential diaphragm actuator would be desired, such as in the mentioned water softener control, or in a heat sensor that would operate on the expansion of fluids or the volatility of liquids, or in a barometer or in an altimeter, or in a vacuum gauge, or the like. In these embodiments, the internal lever arm 21, 30 and 38 would be the force arm and the external lever arm 22, 34 and 40 would be the work arm. If, in a particular application a large pressure differential is anticipated, and a relatively low lever output force from the actuator is desired, the length of the internal arm of the lever may be short and the area of the internal arm may be diminished. If a rapid action with substantial force is desired in a situation where only a comparatively small differential pressure is available the area of the internal arm can be expanded so as to multiply the total force and a relatively short internal arm can be used so that the relatively short arm on the force end relative to the work end can produce a high-speed operation. Of course, by extending the lever arm of the force end relative to the work end an increase of mechanical advantage can be obtained at the expense of reduced speed of operation. The important feature of the invention is that any pressure differential actuator embodying the present invention may be readily tailored to suit the requirements of any application.

The diaphragm actuator present invention is also readily adapted to serve in a variety of devices that require forces to be transmitted, for example, from a rigid mechanical system to a fluid system such as in pumps, shock absorbers, pneumatic cushioning devices and the like. In these embodiments the external lever arm 22, 34 and 40 would be the force arm and the internal lever arm 21, 30 and 38 would be the work arm. A shock absorber using an incompressible liquid can be made from the embodiment shown in FIGS. 1 and 2 by filling both of the chambers 12 and 13 with the liquid and joining chambers 12 and 13 through the ports 8 and 9 with a constricted conduit (not shown). Alternatively valved ports through the diaphragm could be used instead of an external conduit to make a liquid shock absorber. The mechanism to be damped may then be joined to the external lever arm 22. If the fluid were a compressible gas, a shock absorber or a pneumatic cushioning device could be made of the first embodiment by filling the chambers 12 and 13 with the gas and plugging the ports 8 and 9. If a liquid is used in a shock absorber application, appropriate valving in the conduit (not shown) joining the ports 8 and 9 could provide differential damping between the two directions of motion of the force arm 22. To make a pump of the embodiment shown in FIGS. 1 and 2, one need only connect the ports 8 and 9 to a system containing a reservoir (not shown) of fluid to be pumped and an appropriate system (not shown) of conduits and valves, or additional valved ports could also be added.

Those skilled in the art will appreciate the fact that the housing 1 with its chambers 12 and 13 and ports 8 and 9 is scarcely ideally suited for all applications of this invention. What is here shown is deemed optimum for the mentioned water softener application. For all other purposes, the housing 1 with its chamber 12 and 13 and ports 8 and 9, is merely representative of a generalized sealed system, which in actuality may take innumerable, different forms. The possibility should not be overlooked that the external arm 22 may be embedded in another membrane forming a diaphragm in a second sealed system. In the latter embodiment, the invention would be used as a rigid communication between two sealed systems, instead of a communication from a sealed system to a rigid system.

In addition to the functional advantages already mentioned, the present invention also makes possible collateral advantages that may be even more important. The entire diaphragm actuator may be molded from plastics, since it requires no machined or precision surfaces. This construction also eliminates corrosion problems by exposing only relatively inert plastics. Since the entire diaphragm actuator and the immediate housing, requires at most only three integral members that can be readily assembled and disassembled without special tools, cost of manufacture is minimized, and repair and servicing requires almost no labor and little skill. Sealing of the chambers 12 and 13 is virtually perfect and foolproof so that forces to be measured or applied are readily and reliably isolated from foreign influences. Also, both chambers are provided with access openings through the fittings 8 and 9 so that unavoidable extraneous forces can be cancelled by introducing them on both sides of the diaphragm. This would seem to be particularly important where the invention is used to measure pressure differentials. For example, in a water-softener installation, the ion-sensitive resin may be introduced in one chamber 12 or 13 and water from the softener can be introduced into both chambers so that the water pressure on both sides of the diaphragm is equalized and only the resin volume change is detected by the pressure differential diaphragm actuator.

The invention, however, is not limited to the best methods presently contemplated that are disclosed above for carrying it out, but is distinctly claimed and particularly pointed out in the claims that follow.

I claim:

1. A pressure differential diaphragm actuator comprising the combination of housing having a hollow interior and an actuator opening through one wall communicating with said hollow interior;

a lever actuator mounted in said actuator opening, and having a first lever arm inside said housing, second lever arm projecting outside said housing, and a fulcrum portion located in said actuator opening;

a pivotal mounting for said fulcrum portion of said actuator being formed in said opening by a resiliently flexible and deformable material surrounding said lever actuator and forming a seal between said lever actuator and said housing wall at said opening;

and a membrane fastened to said first lever arm of said lever, having its periphery fastened to said interior of said housing to divide said interior of said housing into two chambers on opposite sides of said membrane, and being adapted to allow said lever actuator to pivot about said pivotal mounting in said housing wall by deforming said resiliently flexible and deformable materials; said first lever arm of said lever being in said membrane;

said membrane being made of said resiliently flexible and deformable material, said membrane and said pivoted mounting for said lever actuator being integrally formed, and said membrane having an expandible pleat formed between said first lever arm of said lever actuator at its periphery.

2. A pressure differential diaphragm actuator comprising the combination of a housing having a hollow interior and including two cup-shaped housing members with mating open ends assembled together;

a sealing member of a resiliently flexible and deformable material clamped between said mating open ends of said housing members to form a seal therewith;

a membrane bisecting said hollow interior of said housing to form separate chambers on opposite sides of it and being sealingly fastened about its periphery to interior surfaces of said hollow interior of said housing;

a lever actuator mounted for pivotal movement through said sealing ring having a first lever arm within said hollow interior of said housing fastened to said membrane and a second lever arm projecting outside of said housing;

and said membrane being made of a resiliently flexible and deformable material and having a pleated portion adjacent its periphery.

3. A pressure differential diaphragm actuator as set forth in claim 2 wherein said membrane and said sealing member are a single integral formed unit;

and said first lever arm of said lever actuator is embedded in said membrane and through said sealing member.